(12) United States Patent
Tanaka

(10) Patent No.: US 11,592,840 B2
(45) Date of Patent: Feb. 28, 2023

(54) DRIVING CONTROL DEVICE FOR REMOTE CONTROLLED HELICOPTER

(71) Applicant: Futaba Corporation, Mobara (JP)

(72) Inventor: Masahiro Tanaka, Mobara (JP)

(73) Assignee: FUTABA CORPORATION, Mobara (JP)

( * ) Notice: Subject to any disclaimer, the term of this patent is extended or adjusted under 35 U.S.C. 154(b) by 486 days.

(21) Appl. No.: 16/691,721

(22) Filed: Nov. 22, 2019

(65) Prior Publication Data

US 2020/0166955 A1 May 28, 2020

(30) Foreign Application Priority Data

Nov. 27, 2018 (JP) .............................. JP2018-221380

(51) Int. Cl.
*G05D 1/08* (2006.01)
*B64C 39/02* (2023.01)
*B64C 27/12* (2006.01)
*G05D 1/00* (2006.01)
*B64C 27/57* (2006.01)

(52) U.S. Cl.
CPC ........... *G05D 1/0816* (2013.01); *B64C 27/12* (2013.01); *B64C 27/57* (2013.01); *B64C 39/024* (2013.01); *G05D 1/0011* (2013.01); *G05D 1/0858* (2013.01); *B64C 2201/14* (2013.01)

(58) Field of Classification Search
CPC .. G05D 1/0816; G05D 1/0011; G05D 1/0858; B64C 27/12; B64C 27/57; B64C 39/024; B64C 2201/14
See application file for complete search history.

(56) References Cited

U.S. PATENT DOCUMENTS

| 4,980,835 A | 12/1990 | Lawrence et al. |
| 2006/0271251 A1* | 11/2006 | Hopkins .............. G05D 1/0022 701/2 |
| 2019/0390976 A1* | 12/2019 | Anderson ............... G06F 3/013 |
| 2020/0103922 A1* | 4/2020 | Nonami ............... G05D 1/0072 |

FOREIGN PATENT DOCUMENTS

| JP | 2005-247008 A | 9/2005 | |
| JP | 2012076628 A | * 4/2012 | ............. B64C 13/20 |

OTHER PUBLICATIONS

Translated Description of JP-2012076628-A.*

* cited by examiner

*Primary Examiner* — Jess Whittington
(74) *Attorney, Agent, or Firm* — Bacon & Thomas, PLLC

(57) ABSTRACT

A driving control device for a remote controlled helicopter includes an rpm detection unit that detects an rpm of a main rotor, a gyro sensor that detects angular velocities of control axes including roll, pitch and yaw axes, and a control unit that generates a control signal of a control actuator for controlling movements of the control axes based on the angular velocities detected by the gyro sensor and a steering signal sent from a transmitter. The control unit has information on the gyro sensitivities of the control axes and information on a set rpm of the main rotor which are preset for each of the flight states of the remote controlled helicopter, and corrects the gyro sensitivities based on a difference between the set rpm corresponding to a selected flight state among the flight states and an rpm of the main rotor detected by the rpm detection unit.

7 Claims, 3 Drawing Sheets

DRIVING CONTROL DEVICE FOR REMOTE CONTROLLED HELICOPTER

TECHNICAL FIELD

The present disclosure relates to a driving control device for a remote controlled helicopter such as a model helicopter, an aerial cinematography helicopter, a crop spraying helicopter, or the like.

BACKGROUND

For example, a remote controlled helicopter 11 such as a model helicopter or the like basically has a configuration shown in FIG. 3. The driving of the remote controlled helicopter 11 is controlled by a main rotor 12 attached to an airframe 11a and a tail rotor 13 attached to a tail 11b. The main rotor 12 generates ascending force by rotation and controls ascending/descending, forward/backward, and leftward/rightward driving of the remote controlled helicopter 11 by adjusting a pitch angle. The tail rotor 13 has a function of canceling a reaction torque caused by the rotation of the main rotor 12 and controlling horizontal rotation of the remote controlled helicopter 11.

However, in the remote controlled helicopter 11, a gyro device (driving control device) is installed at the airframe 11a to stabilize a posture during flight, as disclosed in, e.g., Japanese Patent Application Publication No. 2012-245906. The gyro device is provided with a gyro sensor for detecting angular velocities of a roll axis, a pitch axis, and a yaw axis. The gyro device compares the angular velocities of the axes detected by the gyro sensor with a steering signal, controls the actuator to follow the steering signal, and controls the remote controlled helicopter 11.

Further, a gyro device having a governor device for an engine or an electric motor has been put into practical use. In accordance with the gyro device having the governor device, the revolution per minute (rpm) of the main rotor 12 can be maintained at a constant level even if a load of the main rotor 12 changes during the flight of the remote controlled helicopter 11.

As a transmitter for remote-controlling the remote controlled helicopter 11, there is known one having a flight condition (flight mode) function capable of switching setting of the gyro sensitivity and the governor function of the gyro device.

In this flight condition function, the mode is specified depending on the flight state (e.g., hovering, loop, roll, auto-rotation, or the like) of the remote controlled helicopter 11; the mode is switched by a switching device of the transmitter; and the rpm of the rotor 12, the amount of movements of the three axes (roll axis, pitch axis, yaw axis), and the gyro sensitivities of the three axes are preset for each mode.

Specifically, when it is desired to firmly maintain the posture of the remote controlled helicopter 11 by using the flight condition function, the rpm of the main rotor 12 during the hovering is set to be lower than that during flight and the gyro sensitivity is set to be higher than that during the flight. In the flight that requires greater thrust than hovering, the rpm of the main rotor 12 is set to be higher than that during hovering and the gyro sensitivity is set to be lower than that during hovering in order to make steering of the remote controlled helicopter easy and accurate.

However, in the conventional setting, when the remote controlled helicopter 11 is overflying and it is difficult to change the gyro sensitivity during the flight due to an overspeed caused by an increase in an rpm of the main rotor 12 in a state where the gyro sensitivity is increased, the gyro sensitivity is maintained at a high level and the posture may be unstable due to the vibration of the tail rotor 12. On the other hand, when the rpm of the main rotor is decreased and it is difficult to change the gyro sensitivity during the flight due to a load such as soaring or the like applied in a state where the gyro sensitivity is decreased, the gyro sensitivity is maintained at a low level and the airframe 11a of the remote controlled helicopter 11 may shake due to the insufficient gyro sensitivity.

Further, when the engine or the electric motor of the remote controlled helicopter 11 is stopped and the remote controlled helicopter 11 is descending and landing by inertia, the flight condition function may be switched to the auto-rotation setting by manipulating a switch of the transmitter.

However, in the case of auto-rotation, the rpm of the main rotor 12 is decreased and, thus, it is general to set the gyro sensitivity to a high level to maintain the posture of the remote controlled helicopter 11. Therefore, steering of the remote controlled helicopter becomes difficult. Then, if the airframe 11a of the remote controlled helicopter 11 is tilted, it is difficult to quickly correct the posture. Accordingly, landing may fail or overturn may occur right after landing.

In view of the above, the present disclosure provides a driving control device capable of performing remote control of a remote controlled helicopter more stably compared to the conventional case.

SUMMARY

In accordance with an aspect of the present disclosure, there is provided a driving control device for a remote controlled helicopter, comprising: an rpm detection unit configured to detect an rpm of a main rotor of the remote controlled helicopter; a gyro sensor configured to detect angular velocities of control axes including a roll axis, a pitch axis, and a yaw axis; and a control unit configured to generate a control signal of a control actuator configured to control movements of the control axes based on the angular velocities detected by the gyro sensor and a steering signal sent from a transmitter; wherein the control unit has information on the gyro sensitivities of the control axes which are preset for each of a plurality of flight states of the remote controlled helicopter and information on a set rpm of the main rotor which are preset for each of the plurality of flight states of the remote controlled helicopter, and corrects the gyro sensitivities based on a difference between the set rpm of the main rotor corresponding to a selected flight state among the plurality of flight states and an rpm of the main rotor detected by the rpm detection unit.

Further, the control unit may correct the gyro sensitivities using a value obtained by multiplying the difference between the rpm of the main rotor detected by the rpm detection unit and the set rpm of the main rotor corresponding to the selected flight state by a predetermined correction coefficient.

Further, the control unit may have control data indicating a relationship between the difference and the gyro sensitivity correction value, and correct the gyro sensitivities using the gyro sensitivity correction value of the control data corresponding to the difference between the set rpm and the rpm of the main rotor detected by the rpm detection unit.

Further, the control unit may turn off a gyro function when the rpm of the main rotor is lower than or equal to a set rpm.

Further, the control unit may correct the gyro sensitivities by switching from proportional-integral-differential control to proportional control.

In accordance with the aspect of the present disclosure, the gyro sensitivities of the control axes (roll axis, pitch axis, yaw axis) are corrected based on the difference between the preset rpm of the main rotor corresponding to a selected flight state and an actual rpm of the main rotor and, thus, the remote controlling of the remote controlled helicopter can be performed more stably compared to the conventional case.

BRIEF DESCRIPTION OF THE DRAWINGS

The objects and features of the present disclosure will become apparent from the following description of embodiments, given in conjunction with the accompanying drawings, in which.

DETAILED DESCRIPTION

Hereinafter, embodiments will be described in detail with reference to the accompanying drawings.

Figure 1:
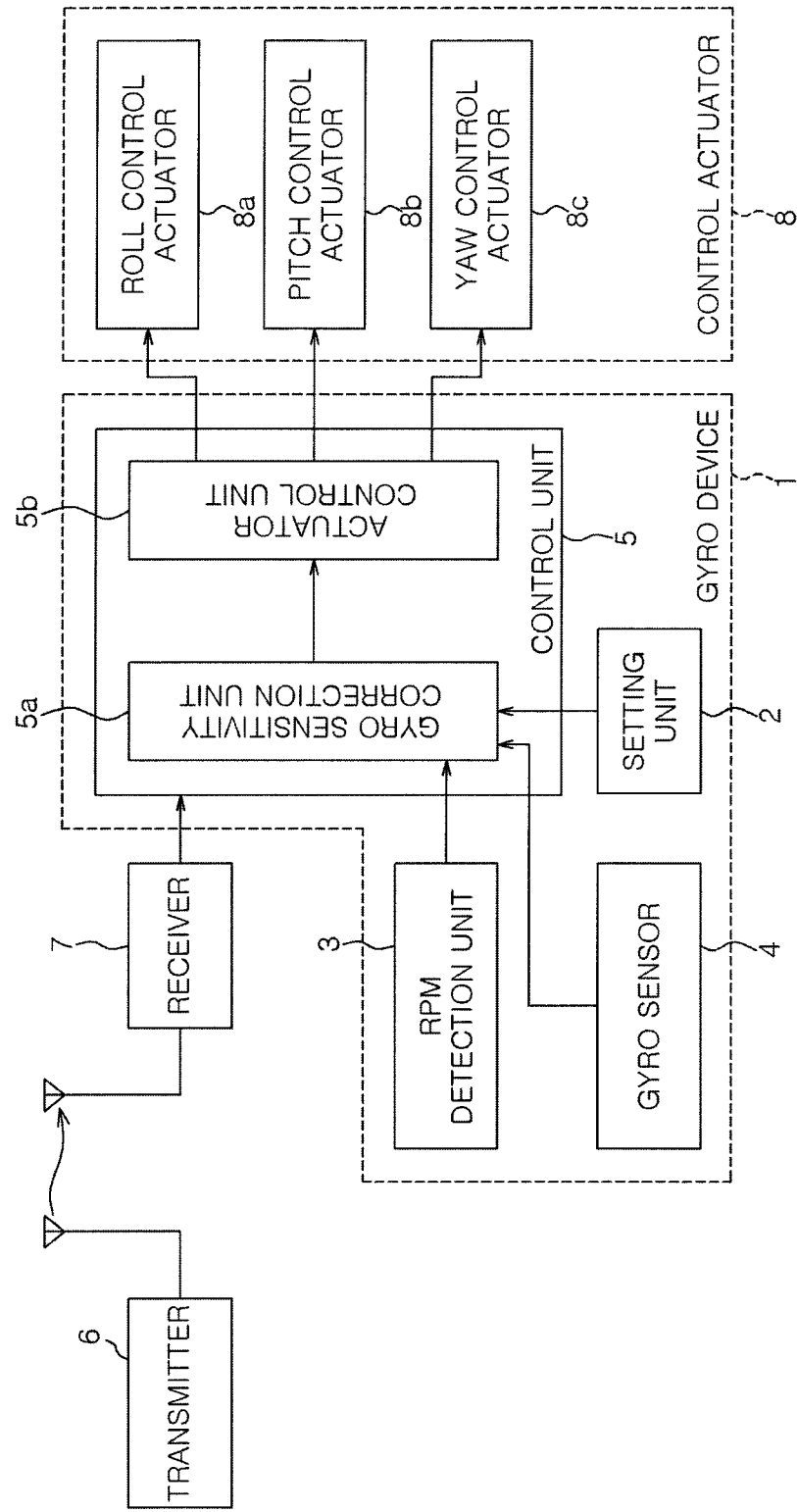
FIG. 1 is a block diagram of a driving control device for a remote controlled helicopter of the present disclosure.

As shown in FIG. 1, a gyro device 1 has a governor function and a flight condition (flight mode) function in addition to a gyro function The gyro device 1 is configured as a driving control device including a setting unit 2, an rpm detection unit 3, a gyro sensor 4, and a control unit 5. The gyro device 1 is installed at, e.g., an airframe 11a of a remote controlled helicopter 11 as shown in FIG. 3.

The governor function is a function for controlling the rpm of the main rotor 12 to a preset rpm.

The flight condition function is a function of specifying a mode depending on a flight state (e.g., hovering, looping, rolling, auto-rotation during landing, or the like) of the remote controlled helicopter 11. For each mode, the rpm of the main rotor 12, the amount of the movements of the control axes, and the gyro sensitivities of the control axes are preset. The mode of the flight condition function is switched based on a steering signal transmitted by a transmitter 6, which is corresponding to a driver's switch operation.

Figure 3:
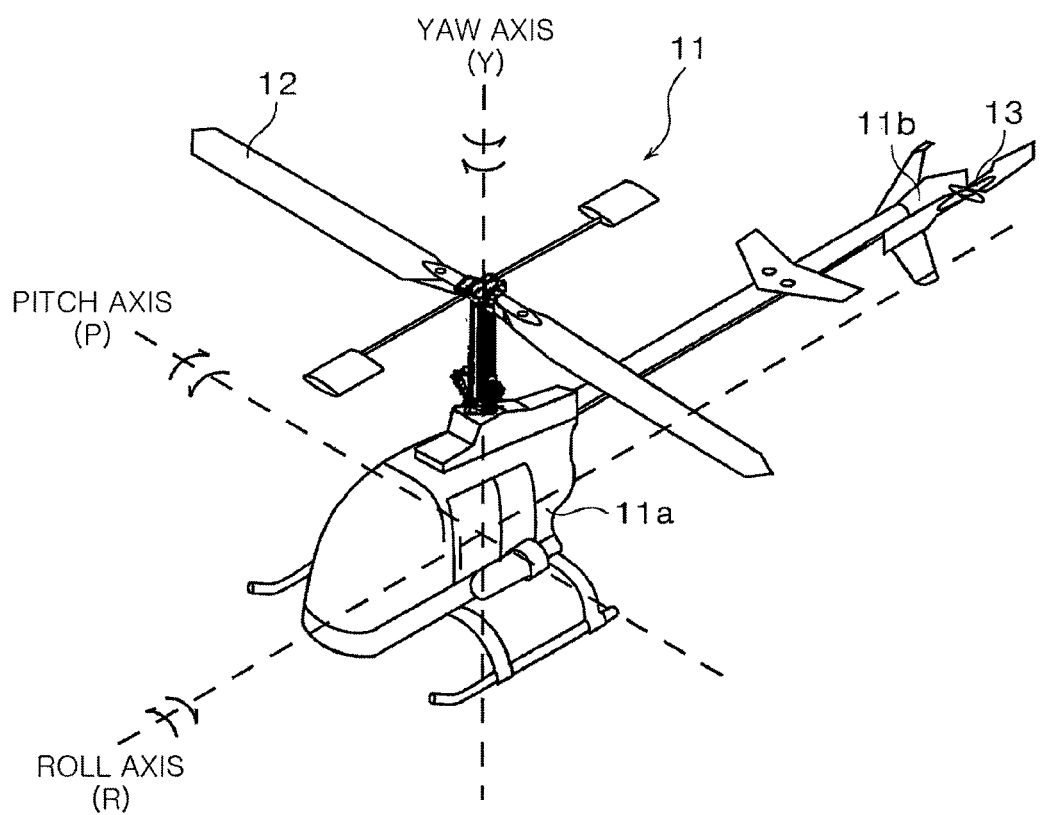
FIG. 3 shows an airframe of the remote controlled helicopter and control axes.

As shown in FIG. 3, the control axes include a roll axis R (penetrating through the airframe 11a in a front-rear direction), a pitch axis P (penetrating through the airframe 11a in a left-right direction), and a yaw axis Y (penetrating through the airframe 11a in an up-down direction).

First, the gyro sensitivity used in the present embodiment will be described. The gyro sensitivity indicates a control gain of the gyro device 1. Generally, the gyro device 1 detects a change in the posture of the airframe 11a by using the gyro sensor 4 and amplifies an angular velocity signal (gyro sensor signal) to transmit a correction rudder signal (i.e., a control signal to be described later) corresponding to the magnitude of the amplified angular velocity signal to a control actuator 8 (servo motor or the like) to be described later and thus stop shaking of the airframe 11a. The degree (magnitude) of amplifying the angular velocity signal at this time is the gyro gain, which corresponds to the gyro sensitivity.

Therefore, as the gyro gain (gyro sensitivity) increases, the operation amount for the correction rudder with respect to the change in the posture of the airframe 11a increases. Accordingly, the response speed to an external noise (e.g., wind and effect of the reaction torque due to the rotation of the main rotor 12) increases. However, if the gain (sensitivity) is excessively increased, hunting phenomenon (oscillation phenomenon in which the airframe 11a vibrates slightly) occurs, and the flight becomes unstable.

On the other hand, if the gyro gain (gyro sensitivity) is small, it is difficult to sufficiently achieve the effect of the gyro device 1. Thus, the force for maintaining/keeping the posture becomes weak and the behavior becomes unstable. Accordingly, it is required to appropriately control the gyro gain (gyro sensitivity). The appropriate gain (sensitivity) varies depending on the characteristics of the airframe 11a and the control actuator 8 (servo motor, or the like) being used, and thus needs to be adjusted/corrected when needed.

Referring to FIG. 1, a transmitter 6 transmits a steering signal corresponding to a driver's stick operation (throttle operation, aileron operation, elevator operation, or rudder operation) as radio waves to perform remote controlling of the remote controlled helicopter 11. A receiver 7 receives the steering signal from the transmitter 6 as radio waves, demodulates the received radio waves to the original steering signal, and outputs the steering signal to the gyro device 1.

The setting unit 2 sets on/off of the gyro function, on/off of the governor function, the set rpm value of the main rotor 12 and the set gyro sensitivity value of the control axes (roll axis R, pitch axis P, and yaw axis Y) for each flight state (e.g., hovering, looping, rolling, auto-rotation during landing, or the like), a correction coefficient of a gyro sensitivity to be described later, or the like.

The set gyro sensitivity value represents the amount of deviation from a desired position where the posture of the remote controlled helicopter 11 needs to be held in order to control the control actuator 8 to cancel the change in the posture of the remote controlled helicopter 11, based on the angular velocities of the control axes (roll axis R, pitch axis P, and yaw axis Y). Specifically, the set gyro sensitivity value is set to determine the amount of movement of a swashplate by PWM control of the servo motor for an angular velocity for a specific axis in the case of restoring the posture of the remote controlled helicopter 11 by changing the inclination of the swash plate by the PWM control of the servo motor of the control actuator 8.

The rpm detection unit 3 measures an rpm of the main rotor 12 that is a main rotor blade of the remote controlled helicopter 11. The rpm detection unit 3 detects the rpm of the main rotor 12 and outputs a main rotor rpm signal corresponding to the detected rpm (actual rpm) to the control unit 5.

The gyro sensor 4 is an angular velocity sensor for detecting angular velocities of the control axes (roll axis R, pitch axis P, and yaw axis Y) to detect a change in the posture of the remote controlled helicopter 11. The gyro sensor 4 detects the angular velocities of the roll axis R, the pitch axis P, and the yaw axis Y of the remote controlled helicopter 11, and outputs angular velocity signals (roll axis angular velocity signal, pitch axis angular velocity signal, and yaw axis angular velocity signal) corresponding to the detected angular velocities to the control unit 5 (gyro sensitivity correction unit or gyro sensitivity correction unit 5a).

The control unit 5 controls overall functions of the gyro device 1, and has information on the set rpm values of the main rotor 12 and the set gyro sensitivity values of the control axes (roll axis R, pitch axis P, and yaw axis Y) which are preset for each of the flight states (e.g., hovering, looping, rolling, auto-rotation during landing, or the like) of the remote controlled helicopter 11.

The control unit 5 controls the control actuator 8 by using a control signal generated based on the setting information from the setting unit 2, a steering signal from the receiver 7, am rpm signal of the main rotor from the rpm detection unit 3, and the angular velocity signals of the control axes (roll axis R, pitch axis P, and yaw axis Y) from the gyro sensor 4. The control unit 5 includes a gyro sensitivity correction unit 5a and an actuator control unit 5b.

When the gyro function is enabled, the gyro sensitivity correction unit 5a corrects the gyro sensitivities of the control axes (roll axis R, pitch axis P, and yaw axis Y) by using any one of methods (1) to (4) to be described below.

(1) The gyro sensitivities of the control axes are corrected based on the difference between the set rpm value of the main rotor 12 corresponding to the flight state and the actual rpm of the main rotor 12 detected by the rpm detection unit 3. In other words, when the actual rpm of the main rotor 12 is different from the set rpm value corresponding to the governor function of the transmitter 7, the gyro sensitivities of the control axes are corrected based on the rpm difference.

A case of correcting the gyro sensitivity of the roll axis R will be described as an example. On the assumption that the set rpm value of the main rotor 12 set depending on the flight state is RPMs; the actual rpm detected by the rpm detection unit 3 is RPMx; the set gyro sensitivity value of the roll axis R set depending on the flight state is GAINr; and the gyro sensitivity correction coefficient (sensitivity correction value per rpm difference of 1 rpm) of the roll axis R set depending on the flight state is COMPr, the gyro sensitivity AGAINr of the roll axis R after the correction is calculated as AGAINr= (RPMs−RPMx)×COMPr+GAINr.

The gyro sensitivities of the pitch axis P and the yaw axis Y after correction can also be calculated in the same manner as that for the roll axis R.

(2) The gyro sensitivities of the control axes are corrected with the gyro sensitivity correction value corresponding to the change in the actual rpm of the main rotor 12 detected by the rpm detection unit 3, by using the gyro sensitivity correction values of the control axes which are set and stored per each predetermined change (e.g., 10 rpm) by the setting unit 2.

(3) The gyro sensitivities of the control axes are corrected using the control data set for the roll axis R, the pitch axis P, and the yaw axis Y. In other words, the gyro sensitivities of the control axes are corrected to the gyro sensitivity of the control data corresponding to the difference between the set rpm value of the main rotor 12 set depending on the flight state and the actual rpm of the main rotor 12 detected by the rpm detection unit 3.

Figure 2:
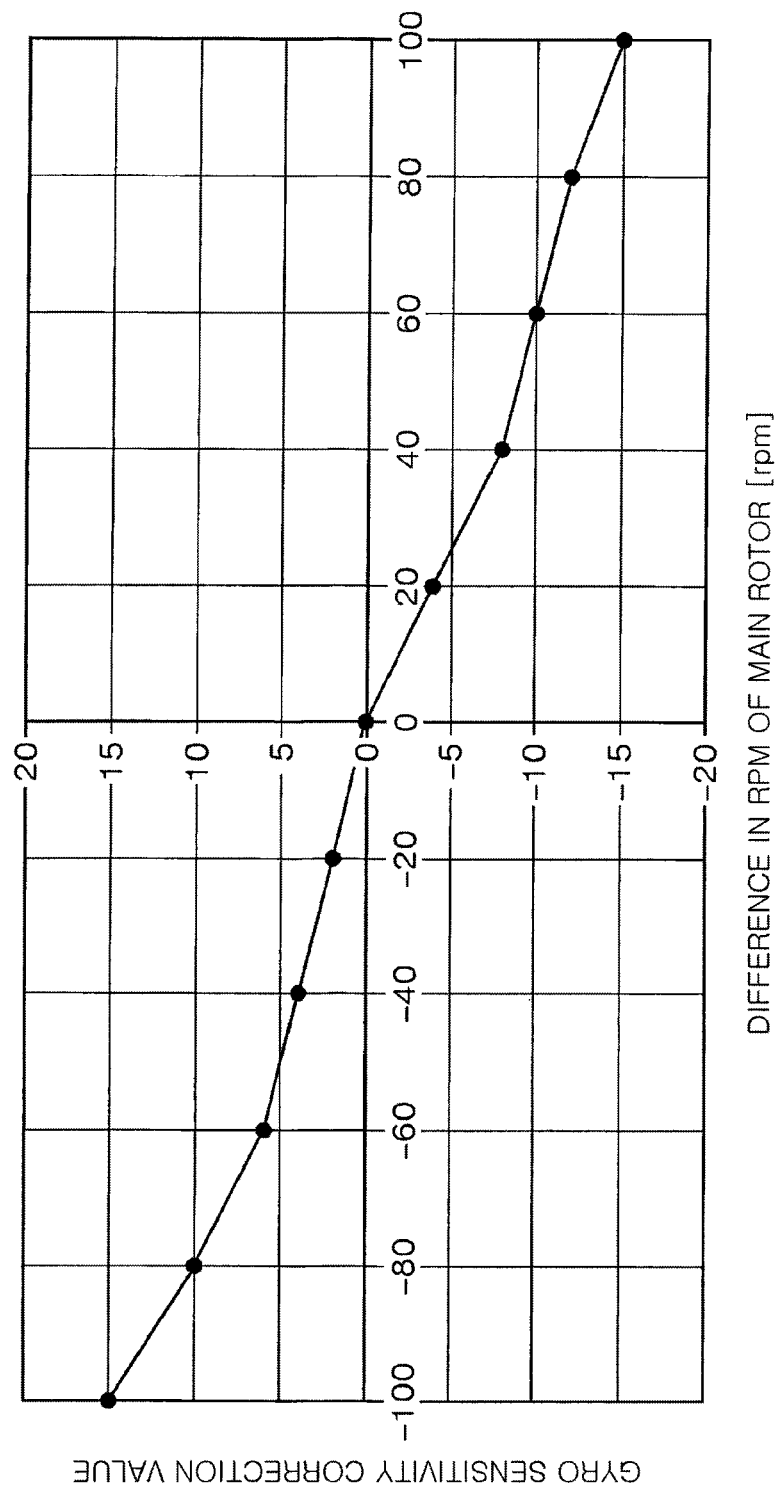
FIG. 2 shows an example of control data indicating a gyro sensitivity correction value with respect to the difference between the actual rpm of the main rotor and the set rpm of the main rotor.

FIG. 2 shows an example of control data of the roll axis R indicating the gyro sensitivity correction value with respect to the difference between the actual rpm of the main rotor 12 and the set rpm of the main rotor 12.

Referring to FIG. 2, the horizontal axis represents the difference between the actual rpm of the main rotor 12 and the set rpm value of the main rotor 12 (actual rpm-set rpm) and the vertical axis represents the gyro sensitivity correction value of the roll axis R, 0 rpm on the horizontal axis being the set rpm value (e.g., 1500 rpm) of the main rotor 12 set depending on the flight state. In the example of FIG. 2, it is necessary to lower the gyro sensitivity slightly larger to suppress hunting in the case where the rpm of the main rotor 12 increases. Accordingly, the graph is asymmetric on the + side and the − side.

In the case of correcting the gyro sensitivity of the roll axis R shown in FIG. 2, when the set rpm value of the main rotor 12 set depending on the flight state is 1500 rpm and the actual rpm of the main rotor 12 detected by the rpm detection unit 3 is 1560 rpm, the difference between the actual rpm of the main rotor 12 and the set rpm value of the main rotor 12 is 60 rpm and, thus, the gyro sensitivity correction value becomes −10. The gyro sensitivity of the roll axis R is corrected by adding the gyro sensitivity correction value −10 to the set gyro sensitivity value.

In FIG. 2, when the difference exceeds ±100 rpm, the gyro sensitivity correction value corresponding to ±100 rpm is used.

(4) In the case of correcting the gyro sensitivity using the methods (1) to (3), if the rpm of the main rotor 12 is decreased to a set rpm (e.g., 100 rpm), the gyro sensitivities of the control axes are corrected to 0% (the gyro function is off) or a minimum value lower than a preset gyro sensitivity set value to improve the steering effect (in other words, to follow a steering signal sent from the transmitter more accurately). Alternatively, the gyro sensitivities of the control axes are corrected by switching from proportional-integral-differential (PID) control to proportional (P) control. Since the P control does not have an integration function of integrating the errors repeatedly as in the PID control, the steering effect is improved. Therefore, even if the airframe 11a of the remote controlled helicopter 11 is tilted at the time of landing, the posture can be stabilized by the manipulation of the stick of the transmitter 6.

The actuator control unit 5b generates, based on the set gyro sensitivity values of the control axes (roll axis R, pitch axis P, and yaw axis Y) corrected by the gyro sensitivity correction unit 5a, a control signal of the control actuator 8 for controlling a movements of the control axes depending on the angular velocities of the control axes detected by the gyro sensor 4 and controls the control actuator 8 by using the control signal to follow the steering signal.

The control actuator 8 includes a roll control actuator 8a, a pitch control actuator 8b, and a yaw control actuator 8c. The control actuator 8 is configured as a driving unit having a servo motor that is PWM-controlled by the control signal generated by the actuator control unit 5b. The driving unit controls a roll angle, a pitch angle, and a yaw angle by the rotation of the servo motor to follow the steering signal.

In the example of FIG. 1, the setting unit 2 is built in the gyro device 1. However, the present disclosure is not limited thereto. For example, a separate device that can be electrically connected to the gyro device 1 may serve as the setting unit 2. In addition, the transmitter 6 can be used as the setting unit 2, and the setting can be performed through the receiver 7 by manipulating a stick and a switch of the transmitter 6.

In the case of correcting the gyro sensitivities of the control axes (roll axis R, pitch axis P, and yaw axis Y) in the gyro device 1 configured as described above, the set rpm of the main rotor 12, the set gyro sensitivity values of the control axes, and the amount of movements of the control axes depending on the flight state are preset using the flight condition (flight mode) function.

When a steering signal generated based on an operator's stick operation is transmitted as radio waves from the transmitter 6 to perform remote control of the remote controlled helicopter 11, the receiver 7 receives the radio waves from the transmitter 6, modulates the received radio waves into the original steering signal, and inputs the steering signal to the gyro sensitivity correction unit 5a of the gyro device 1. Further, the setting information from the setting unit 2, the main rotor rpm signal from the rpm detection unit 3, and the angular velocity signals of the control axes from the gyro sensor 4 are inputted into the gyro sensitivity correction unit 5a.

The gyro sensitivity correction unit 5a corrects the gyro sensitivities of the control axes using any one of the above-described methods (1) to (4). Then, when the gyro sensitivities of the control axes are corrected by the gyro sensitivity correction unit 5a, the actuator control unit 5b generates a control signal of the control actuator 8 depending on the angular velocities of the control axes detected by the gyro sensor 4 based on the corrected gyro sensitivity of the control axes, and controls the control actuator 8 using the control signal to follow the steering signal.

In accordance with the present embodiment, the gyro sensitivities of the axis R, the pitch axis P, and the yaw axis Y) are corrected based on the difference between the set rpm of the main rotor 12 in the selected flight state and the rpm of the main rotor 12 detected by the rpm detection unit 3. Accordingly, the remote control of the remote controlled helicopter 11 can be performed more stably compared to the conventional case.

Specifically, when the remote controlled helicopter 11 is overflying at an overspeed due to an increase in the rpm of the main rotor 12, the gyro sensitivity can be decreased in response to the increase in the rpm. As a result, the stable flight can be realized without vibration of the tail rotor 13.

When the engine or the electric motor of the remote controlled helicopter 11 is stopped and the remote controlled helicopter 11 is landing using the auto-rotation function, if the rpm of the main rotor 12 is decreased to a certain level (e.g., 100 rpm), the gyro sensitivities of the control axes are set to 0% (the gyro function is off) or a minimum value lower than a preset gyro sensitivity set value. Alternatively, the gyro sensitivities of the control axes are corrected by the P control. Accordingly, the gyro sensitivities can be decreased when the remote controlled helicopter lands, and the posture can be corrected even if the airframe 11a of the remote controlled helicopter 11 is tilted because the steering signal corresponding to a driver's stick operation can be followed more accurately.

While the embodiment of the remote controlled helicopter drive control device of the present disclosure has been described above, the present disclosure is not limited thereto. In other words, other embodiments, examples, and operation techniques made by those skilled in the art based on the above-described embodiment are included in the scope of the present disclosure.

The invention claimed is:

1. A driving control device for a remote controlled helicopter, comprising:

a revolution per minute (rpm) detector configured to detect an rpm of a main rotor of the remote controlled helicopter;

a gyro sensor configured to detect angular velocities of control axes including a roll axis, a pitch axis, and a yaw axis; and a controller configured to generate a control signal of a control actuator configured to control movements of the control axes based on the angular velocities detected by the gyro sensor and a steering signal sent from a transmitter;

wherein the controller has information on the gyro sensitivities of the control axes which are preset for each of a plurality of flight states of the remote controlled helicopter and information on a set rpm of the main rotor which are preset for each of the plurality of flight states of the remote controlled helicopter, and corrects the gyro sensitivities based on a difference between the set rpm of the main rotor corresponding to a selected flight state among the plurality of flight states and an rpm of the main rotor detected by the rpm detector.

2. The driving control device for a remote controlled helicopter of claim 1, wherein the controller corrects the gyro sensitivities using a value obtained by multiplying the difference between the rpm of the main rotor detected by the rpm detector and the set rpm of the main rotor corresponding to the selected flight state by a predetermined correction coefficient.

3. The driving control device for a remote controlled helicopter of claim 1, wherein the controller has control data indicating a relationship between the difference and the gyro sensitivity correction value, and corrects the gyro sensitivities using the gyro sensitivity correction value of the control data corresponding to the difference between the set rpm and the rpm of the main rotor detected by the rpm detector.

4. The driving control device for a remote controlled helicopter of claim 1, wherein the controller turns off a gyro function when the rpm of the main rotor is lower than or equal to a set rpm.

5. The driving control device for a remote controlled helicopter of claim 1, wherein the controller corrects the gyro sensitivities by switching from proportional-integral-differential control to proportional control.

6. The driving control device for a remote controlled helicopter of claim 2, wherein the controller corrects the gyro sensitivities by switching from proportional-integral-differential control to proportional control.

7. The driving control device for a remote controlled helicopter of claim 3, wherein the controller corrects the gyro sensitivities by switching from proportional-integral-differential control to proportional control.

\* \* \* \* \*